US006546986B1

(12) United States Patent
Waggoner et al.

(10) Patent No.: US 6,546,986 B1
(45) Date of Patent: Apr. 15, 2003

(54) FIBER PANEL MANUFACTURING METHOD AND APPARATUS

(75) Inventors: Monty Raymond Waggoner, Veneta, OR (US); Delano Halder Fehr, Innisfail (CA)

(73) Assignee: Enviro Board Corporation, Sherman Oaks, CA (US)

( * ) Notice: Subject to any disclaimer, the term of this patent is extended or adjusted under 35 U.S.C. 154(b) by 99 days.

(21) Appl. No.: 09/724,792

(22) Filed: Nov. 28, 2000

(51) Int. Cl.[7] ................................................ B32B 31/00

(52) U.S. Cl. ........................ 156/494; 156/555; 156/581; 156/582; 156/583.1; 241/605

(58) Field of Search ................................ 156/494, 495, 156/555, 581, 582, 583.1; 241/101.01, 186.2, 186.35, 186.4, 224, 605

(56) References Cited

U.S. PATENT DOCUMENTS 2,978,191 A * 4/1961 Kingery .................. 241/605 X
4,003,502 A * 1/1977 Barcell .................... 241/224 X
4,364,526 A * 12/1982 White ...................... 241/186.4
4,381,082 A * 4/1983 Elliott et al. ............ 241/605 X
4,412,659 A * 11/1983 Crawford et al. .... 241/186.2 X
4,448,361 A * 5/1984 Marcy ................. 241/186.4 X
4,451,322 A * 5/1984 Dvorak ........................ 156/461
4,485,976 A * 12/1984 White ................. 241/186.2 X
4,497,448 A * 2/1985 Joa et al. ............. 241/186.4 X
4,790,489 A * 12/1988 Paul ....................... 241/605 X
5,277,372 A * 1/1994 Paul et al. ........... 241/186.4 X
5,472,556 A * 12/1995 Sanko ........................ 156/498
5,730,830 A * 3/1998 Hall ........................... 156/468

* cited by examiner

*Primary Examiner*—James Sells
(74) *Attorney, Agent, or Firm*—John Russell Uren

(57) ABSTRACT

A panel forming method and apparatus used compressed fibrous material such as straw, hay and the like. The fibrous material from bales is debailled by debailler rollers and passed to straw walkers. The straw walkers move the material to crop shredders which deposit the shredded fiber on a conveyor. A leveller roller smooths the mat on the conveyor which mat moves to a picker roller. The picker roller moves the crop into a chute and a compression cavity where the material is severed and compressed by a reciprocating ram. The severed and compressed material has glued paper applied to its upper and lower surfaces and thereafter moves between heated platens for curing the glue. The severed and compressed material now forming a longitudinal panel is pulled by puller rollers and subsequently severed into panels of a desired length.

15 Claims, 17 Drawing Sheets

FIBER PANEL MANUFACTURING METHOD AND APPARATUS

This invention relates to a method and apparatus for forming fiber panels and, more particularly, for forming fiber panels from fiber crop material such as rice, straw and the like.

BACKGROUND OF THE INVENTION

In our U.S. Pat. No. 5,730,830 entitled FIBER PANEL MANUFACTURING METHOD AND APPARATUS(Hall), which issued Mar. 24, 1998, there is disclosed a method and apparatus for forming fiber panel members utilising fiber crop material. The contents of the '830 patent are incorporated herein by reference. While the apparatus there disclosed has utility, certain deficiencies have been discovered since the filing of the application which resulted in the '830 patent.

In the '830 patent, the crop is placed in a debailler/shredder which is circular in nature and which rotates about a vertical axis. Knives are positioned beneath the bale placed in the debailler/shredder. The knives cut the material of the bales into fibers of adjustable length depending on the height of the knives extending into the cylinder. The material severed by the knives was then pneumatically conveyed to a feeder. The feeder used helical screw conveyors to move the fiber material to a compression area where the material was compressed by a reciprocating ram.

A first deficiency was that the use of the adjustable knives removed too much fiber from the material being pneumatically moved to the feeder; that is, the panels formed from the material transported to the compression area would lack sufficient fiber structure which structure was conducive to greater panel integrity.

A further deficiency was with the heated platens used to impart heat to the compressed fiber and cure the flue of the paper applied to the top and bottom of the formed fiber panels. The heated platens utilised plenum chambers. Hot gasses flowed through the plenum chambers. The use of such a structure had difficulties since the quickness of the heating suffered and the sufficiency of the temperatures obtained with the hot gasses was less than anticipated.

Yet a further problem with the apparatus of the '830 patent was that the structure of the fiber panels became inconsistent. The inconsistency resulted from a greater or lesser amount of material being compressed by the reciprocating ram and then continuing down the curing table. The longer the length of compressed material for the panel members became, the more difficulty the ram had in moving the panel. This resulted in panels having lesser densities at the forward end of the panel and greater densities at the rearward end of the panel closer to the reciprocating ram.

Various other deficiencies were also revealed which it is intended to reduce or overcome with the improvements hereinafter described.

SUMMARY OF THE INVENTION

According to one aspect of the invention, there is disclosed a fiber inlet area for bales of fiber material, a debailler area downstream from said fiber inlet area, straw walkers to convey said fiber material from said debailler area to a conveyor and a shredder area to shred said fiber material downstream of said straw walker.

According to a further aspect of the invention, there is provided apparatus for collecting seed and/or grain from a fiber panel forming assembly comprising straw walkers to convey fiber material from a fiber material inlet area to a conveyor assembly, a gathering member beneath said straw walkers and an auger beneath said gathering member for conveying said seed and/or grain to an air evacuation system, said air evacuation system moving said seed and/or grain to a storage area.

According to a further aspect of the invention, there is disclosed a conveyor for fiber material being conveyed from a shredder area to a packer area and a picker adjacent said conveyor at the downstream end of said conveyor and before said packer area, said picker having a series of protruding flexible and non-metallic fingers mounted on a rotatable cylindrical base, said fingers contacting said fiber material on said conveyor and transporting said fiber material to a chute leading to said packer area.

According to yet a further aspect of the invention, there is provided apparatus for curing glue on paper and applying heat to compressed fiber material beneath said paper, said fiber material having upper and lower surfaces, said apparatus comprising an upper and lower platen member operably contacting said paper on said upper and lower surfaces of said compressed fiber material, each of said upper and lower platen members having a plurality of grooves and heating elements in contact with said platen members within said grooves, said heating elements being longitudinal and extending substantially across said platen members, said heating of said platen members being obtained principally by conduction between said heating elements in contact with said platen members.

According to yet a further aspect of the invention, there is disclosed a conveyor, a chute downstream from said conveyor, a packer assembly to move fiber material from said chute to a compression area, a reciprocating ram to compress said material in said compression area and a fiber feed rake assembly for dislodging material in said chute, said fiber feed rake assembly comprising a plurality of protruding fingers on a longitudinally and generally vertically moving support framework, said protruding fingers extending intermittently into said chute during said longitudinal and generally vertical movement of said support framework.

According to still yet a further aspect of the invention, there is provided a reciprocating ram assembly having a forward edge used to shear and compress fiber material used to form panel members in a fiber panel assembly apparatus and a complementary and stationary edge in said fiber panel assembly apparatus which cooperates with said forward edge of said reciprocating ram assembly during said shearing and compression operation, each of said forward edge of said ram assembly and said stationary edge of said fiber panel assembly apparatus being a sharpened cutting edge and used to shear said fiber material during said shearing and compression operation.

According to yet a further aspect of the invention, there is disclosed a pair of puller rolls for grasping and providing movement to a fiber panel formed by a reciprocating ram assembly, said puller rolls being brought into contacting relationship with said formed fiber panel and providing movement to said formed fiber panel downstream of said reciprocating ram assembly, said puller rolls being pneumatically driven.

According to still yet a further aspect of the invention, there is provided a braking tensioner for a paper roll having a diameter, said paper roll containing paper being applied to substantially enclosed compressed fiber material used in forming a panel member, said braking tensioner having a first member for monitoring said diameter of said paper roll during operation of said paper roll and a pressure regulator for applying pressure to said braking tensioner and thereby increasing resistance to movement within said braking tensioner, said pressure regulator being dependent on the position of said first member, said braking tensioner applying greater resistance to rotation of said paper roll when said diameter is lesser and lesser resistance to rotation of said paper roll when said diameter is greater.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
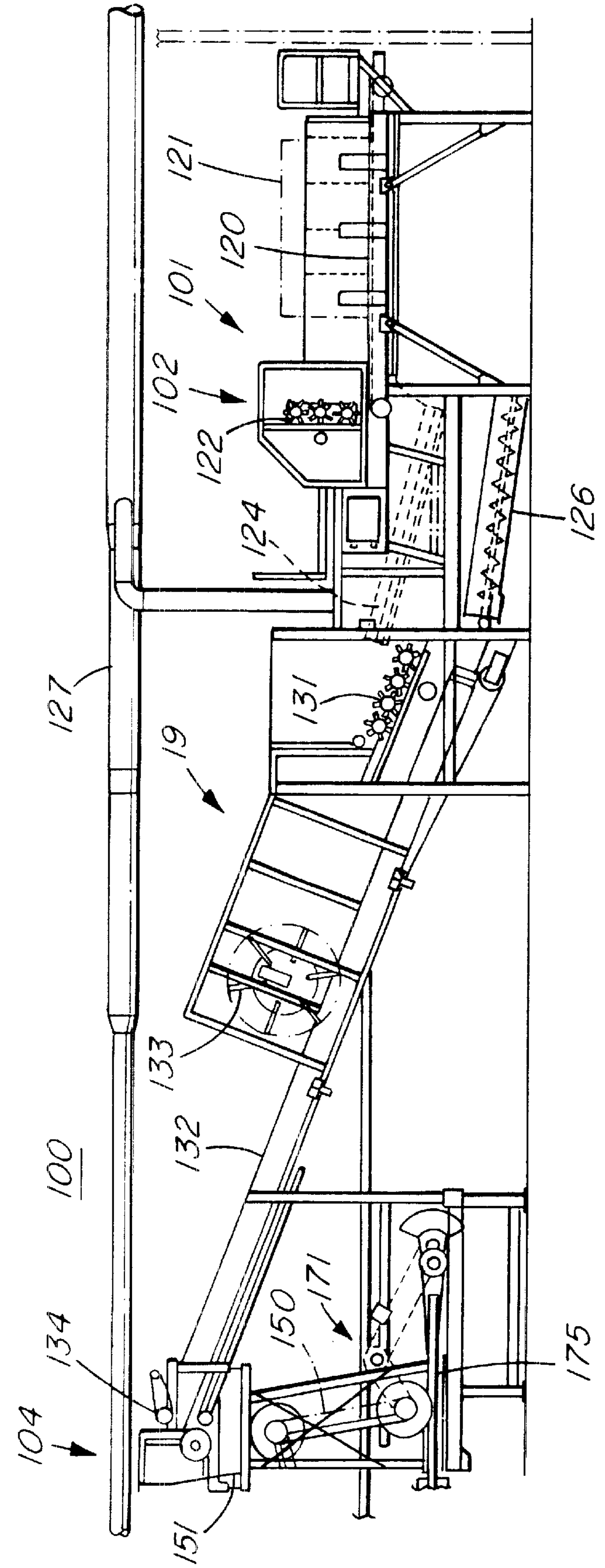
FIG. 1A is a side diagrammatic overall view of the feeding, compression, shearing and paper application areas of the panel forming apparatus according to the invention.
Figure 1B:
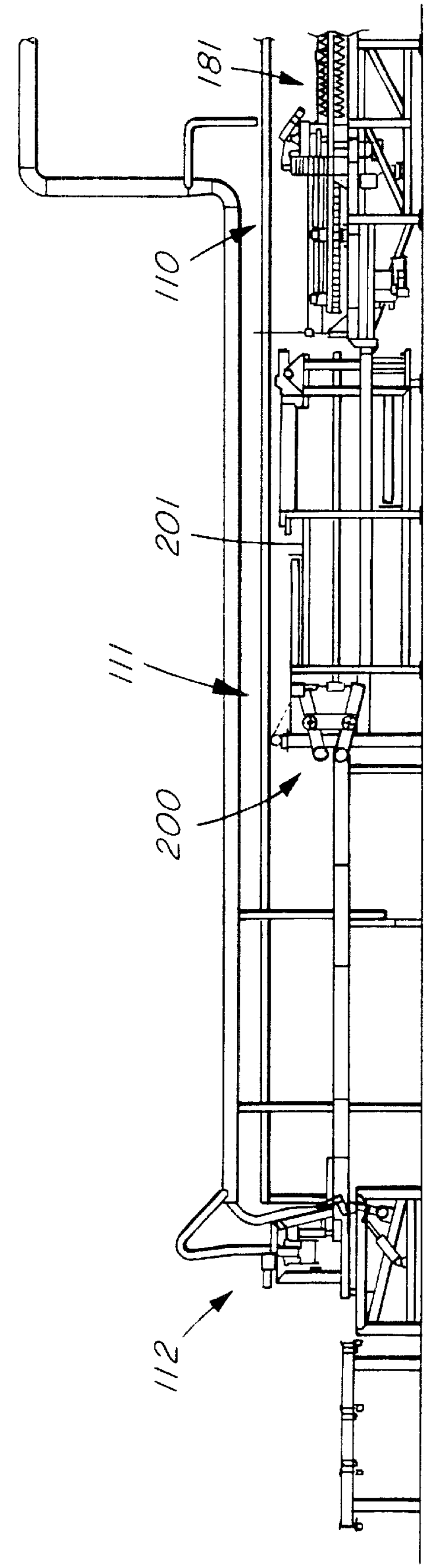
FIG. 1B is a continuation of FIG. 1A and illustrates the curing, panel pulling and cutting areas of the panel forming apparatus according to the invention.
Figure 1C:
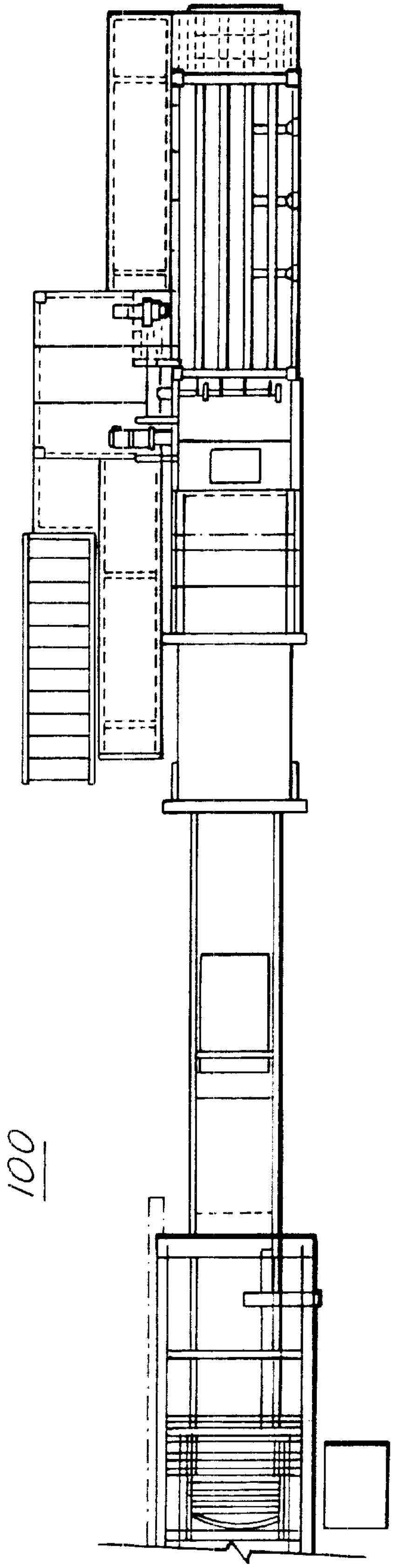
FIG. 1C is a plan top view of the apparatus of FIG. 1A.
Figure 1D:
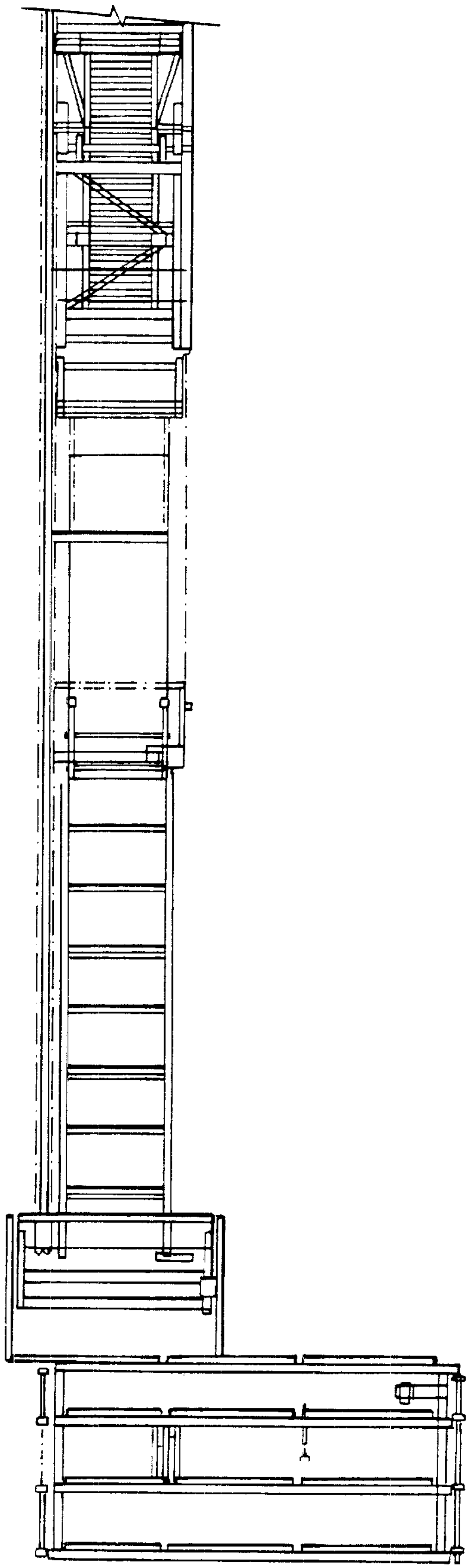
FIG. 1D is a plan top view of the apparatus of FIG. 1B and is a continuation of FIG. 1C.
Figure 2A:
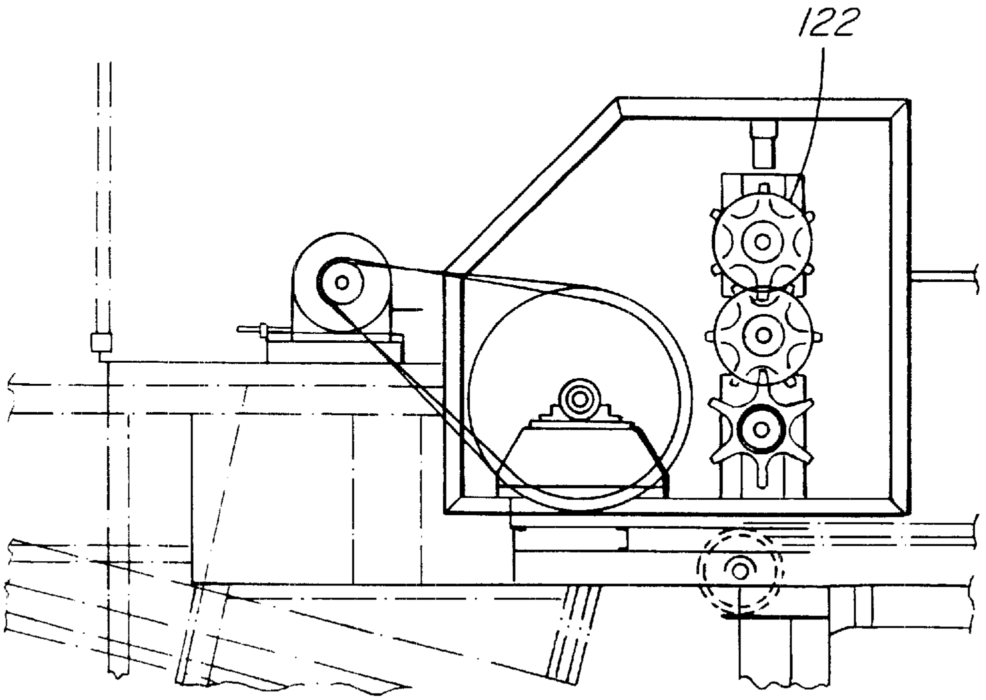
FIGS. 2A and 2B are enlarged side and rear views, respectively, of the infeed area particularly illustrating the debailler rollers according to the invention.
Figure 2B:
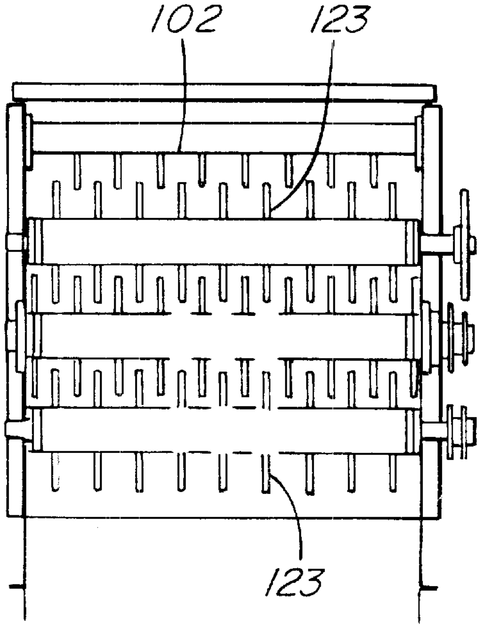

Referring now to the drawings, a fiber panel forming apparatus is illustrated generally at 100 in FIGS. 1A, 1B, 1C and 1D. The fiber panel forming apparatus 100 comprises a plurality of sections or areas of particular interest, namely the feed area generally illustrated at 101 for the straw or fiber based crop intended to be formed into panels, the debailler, straw walker and seed and/or grain return area generally illustrated at 102, the shredder, leveller and conveyor area generally illustrated at 103, the picker and crop delivery area generally illustrated at 104, the crop compression, crop heating and glue curing area generally illustrated at 110, the panel puller roller area generally illustrated at 111 and the panel severing and panel outlet generally illustrated at 112. Several of these areas will be described in greater detail.

Figure 3:
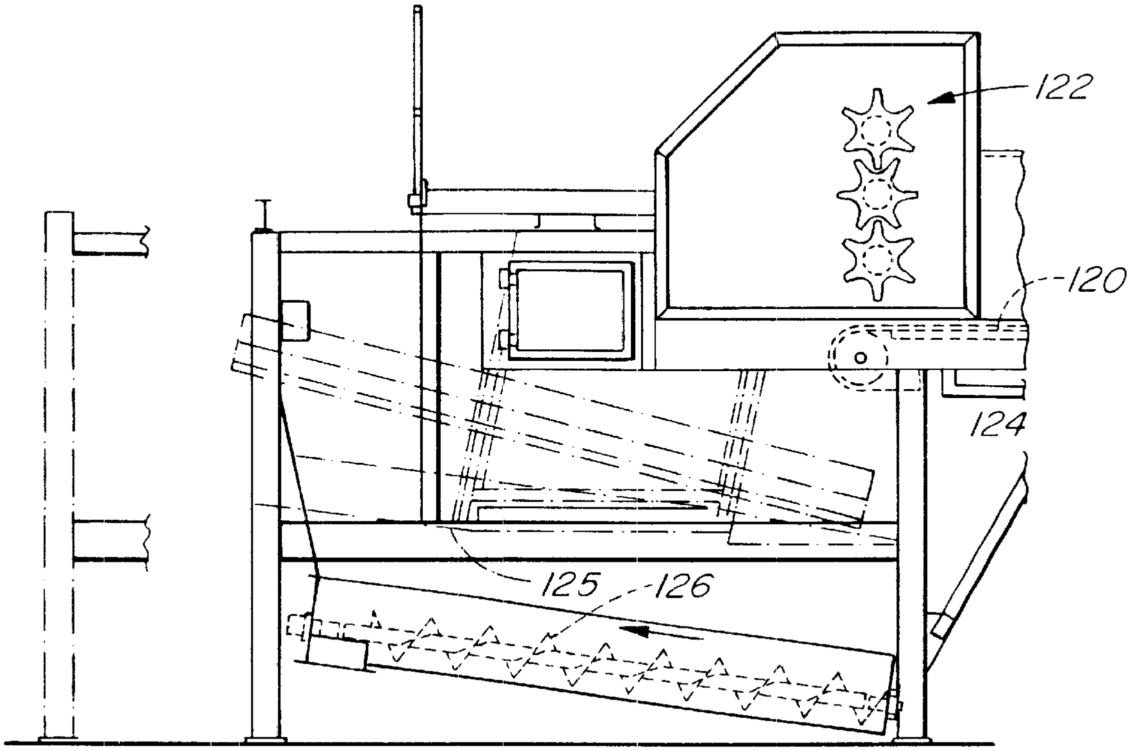
FIG. 3 is a diagrammatic side view particularly illustrating the straw walkers downstream from the debailler rollers according to the invention and the grain auger therebelow.

The feed area 101 includes a conveyor 120. Straw or hay bales 121 are placed on the conveyor 120 and are conveyed thereby to a plurality, namely three(3), of debailler rollers 122 which act to debail the straw in the bales 121 by arms 123 which extend from the debailler rollers 122. The debailled straw is deposited on the straw walkers 124 (FIG. 3). The straw walkers 124 have a configuration well known in the art of combine design and are used to separate grain from crops in crop harvesting applications. The straw walkers 124 will not be further described.

A gathering plate or member 130 is positioned below the straw walkers 124. The gathering member 124 deposits the collected seed and/or grain within an auger 131. The auger 131 moves the collected grain and/or seed leftwardly and deposits it in an air plenum where it is sucked out and conveyed pneumatically to a collecting site by a pneumatic air or vacuum system 127. The collected grain and/or seed has excellent protein value and can therefore be used as a feed source for animals and the like as is known.

Figure 4:
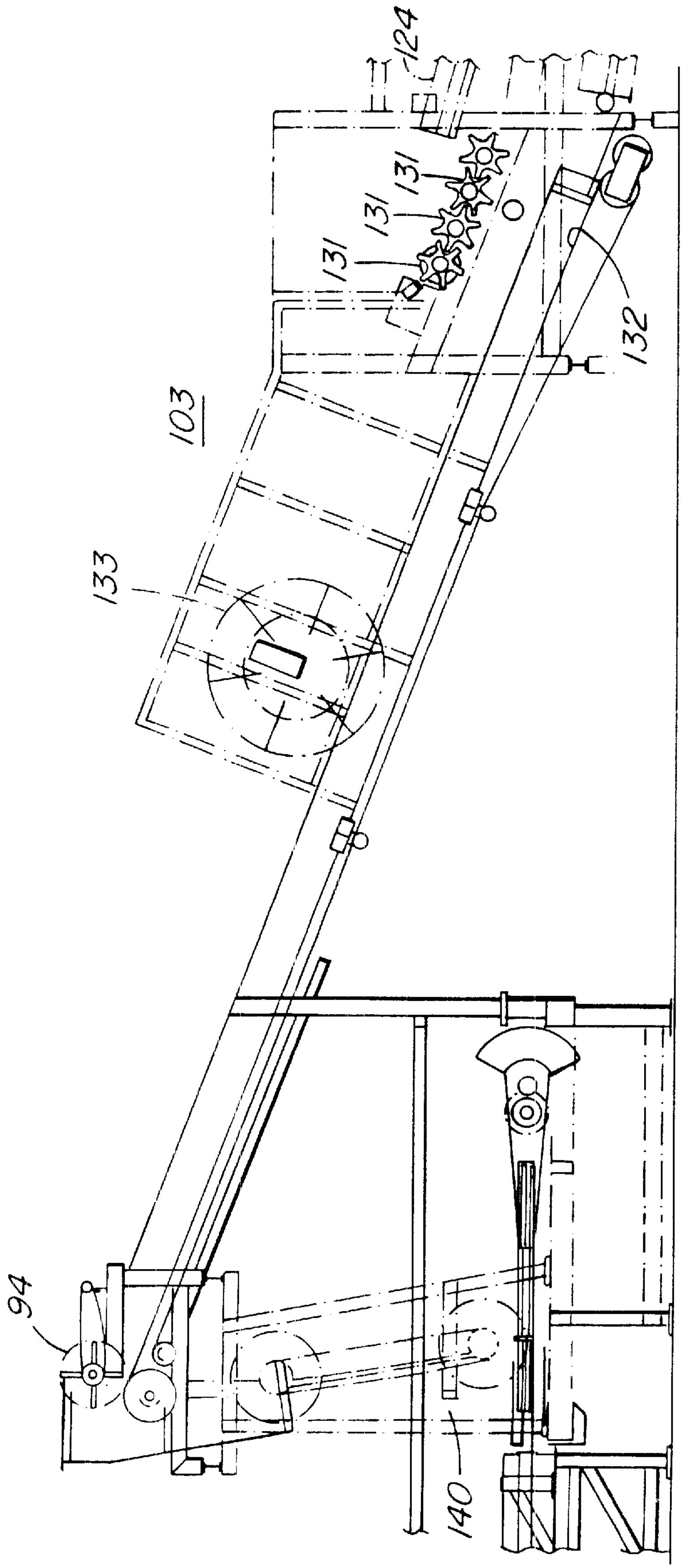
FIG. 4 is a diagrammatic side view of the shredder and leveller areas and the conveyor used for conveying fiber material to a picker roll located at the top of the feed chute.

Referring to FIG. 4, the straw walkers 124 move the crop to the shredder and leveller area 103. The shredder area consists of four(4) shredder rollers 131 which shred the crop conveyed by the straw walkers 124 and deposit it upon a conveyor 132. Conveyor 132 conveys the shredded crop leftwardly and upwardly as viewed in FIG. 4 until a leveller or evener roller 133 is reached whereupon the crop is evened out or levelled prior to passing further upwardly on the conveyor 132 in a relatively smooth mat until the top of conveyor 132 is reached and the crop comes into contact with a picker roller 134.

Figure 5A:
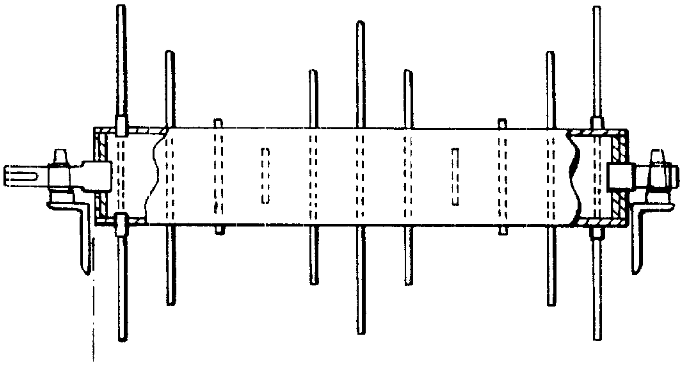
FIGS. 5A–5D are diagrammatic views of the picker roll, its protruding fingers and the method of attachment of the fingers to the cylindrical base.
Figure 5B:
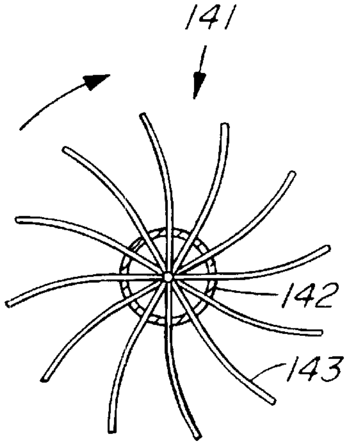
Figure 5C:
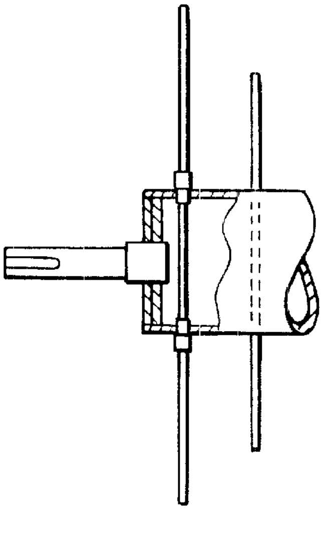
Figure 5D:
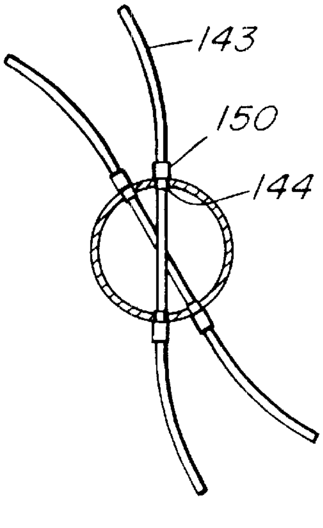
Figure 6A:
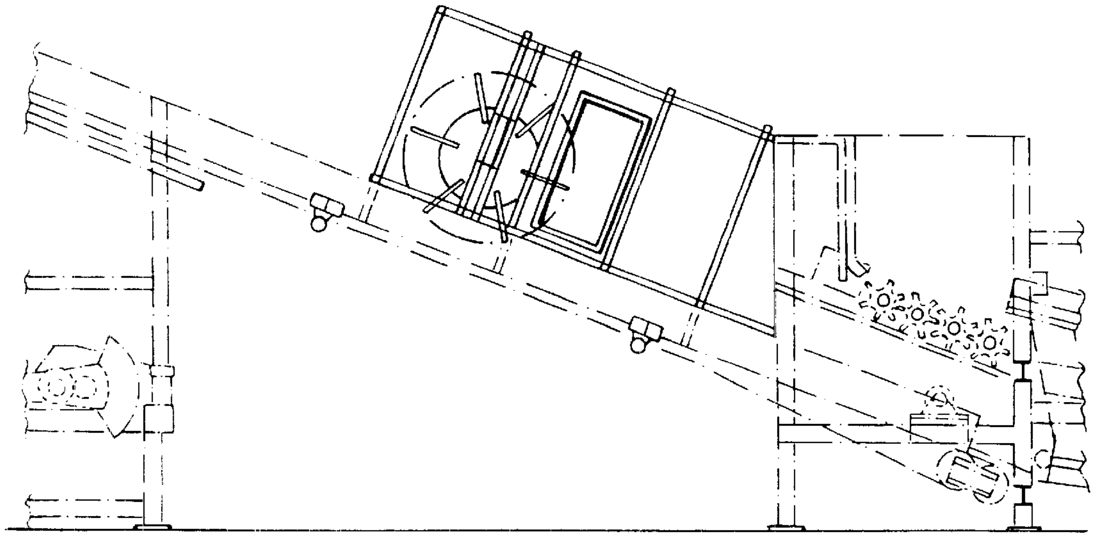
FIGS. 6A and 6B are side and top plan views, respectively, of the skimmer or leveller roll according to the invention.
Figure 6B:
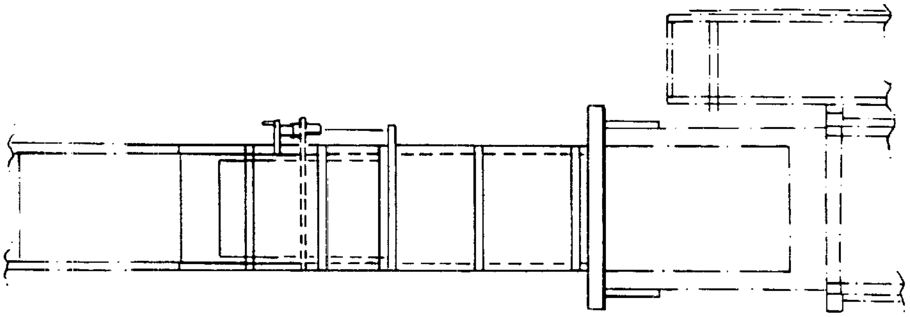

The picker roller 134, illustrated in greater detail in FIGS. 5A–5B, serves to lift the crop from the conveyor 132 and deposits it into the top of chute 140. The picker roll 134 comprises a metallic or cylindrical base 142 within which a plurality of protruding non-metallic fingers and flexible 143 are positioned. The fingers 143 are conveniently plastic material and are mounted to the cylindrical base 142 using standard nut and nipple plumbing techniques; that is, the fingers 143 have a nipple 144 positioned on the fingers 143. A nut 150 is tightened on the nipple 144 which tends to compress the nipple 144 on the finger 143. This allows a good retaining force which securely retains the finger 143 on the cylindrical base 142.

The fingers 143 are conveniently non-metallic and flexible because the fingers 124 may break under operation and fall into the chute 140 (FIGS. 1A and 4). A broken finger 124 may therefore enter the crop compression area. If metallic, such a finger could jam or damage the ram or the severing surfaces during the crop compression operation which is clearly undesirable.

A fiber feed rake generally illustrated at 152 (FIG. 7) extends into the chute 140 and has two purposes. The first purpose is to move crop material into the crop compression area in the lower portion of the chute 140. If there is no or little need for such crop movement because of sufficient material in the crop compression area, the fiber feed rake 152 can be used to clean out the chute 140 in the event of crop clogging the chute 140.

Figure 7A:
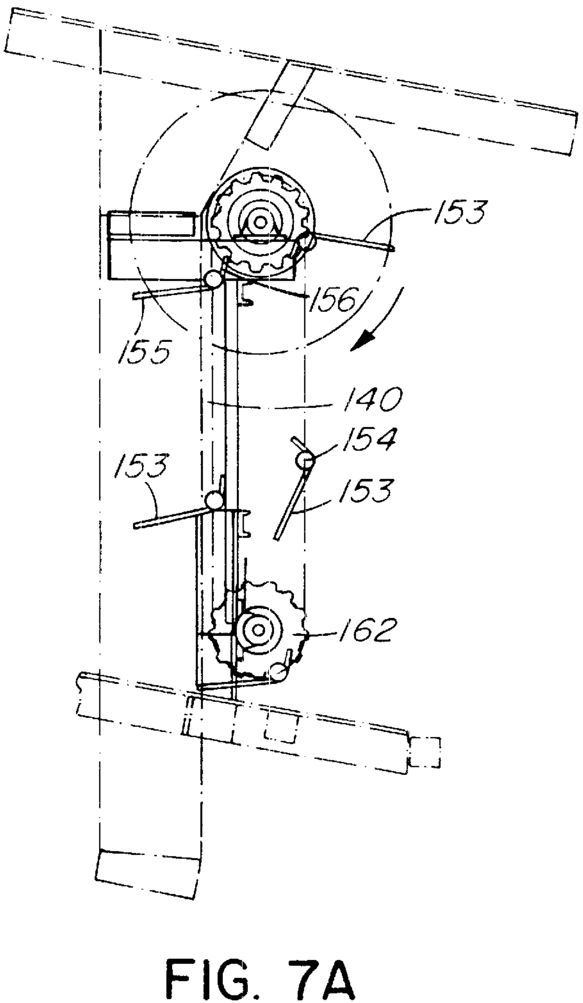
FIGS. 7A, 7B, 7C, and 7D are side, rear and top plan views, respectively, of the fiber feed rake assembly according to the invention.
Figure 7B:
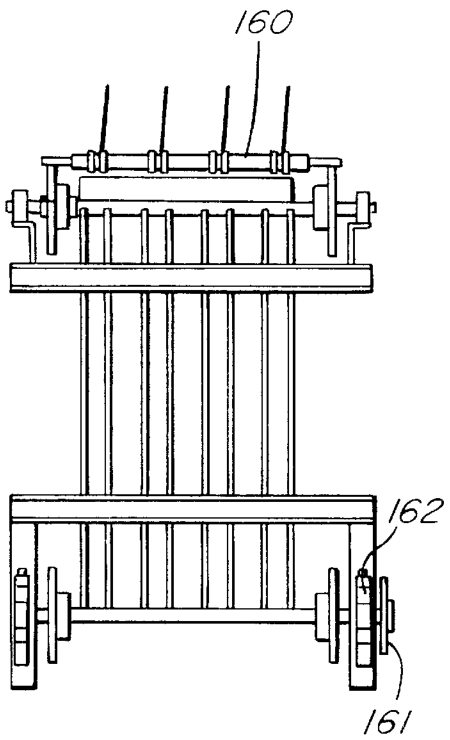
Figure 7C:
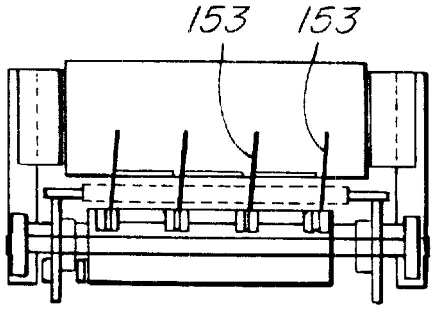
Figure 7D:
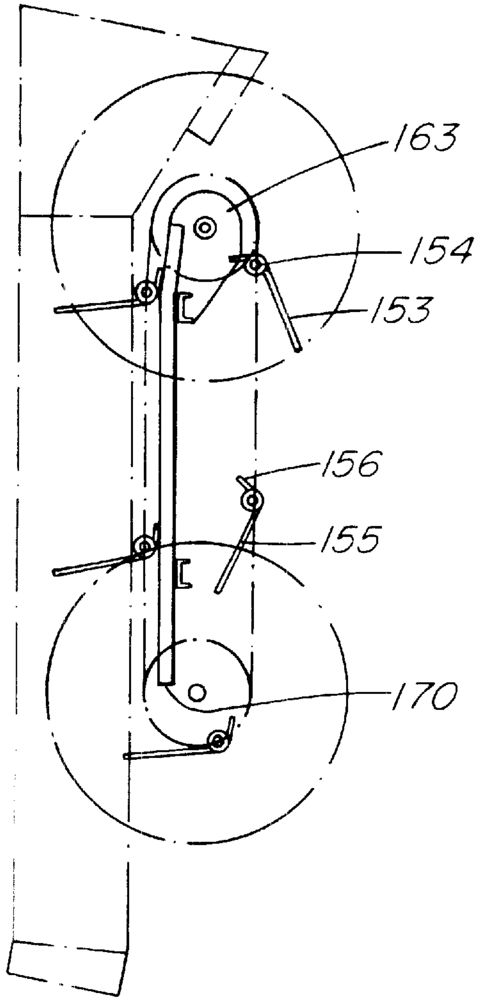

The fiber feed rake 152 comprises a series of metallic fingers 153 which are rotatable about axes 154. The metallic fingers 153 have a relatively long portion 155 and a relatively short portion 156. As the metallic fingers 153 move on a rod-like cylinder 160 connected between twin chain links 161 which are powered by sprockets 162, the relatively short ends will contact a backing plate 163 which will thereby rotate the long portion 155 into an extended position as seen on the left side of FIG. 7D. Slots 164 are provided in the chute 140 and the extended long portions 155 will move through the slots 164 and into the interior of chute 140 as best seen in FIG. 7A so as to move the crop within chute 140 when it is desired to do so. When the movement of the fingers 153 reaches the end 170 of backing plate 163, there is no torsion force being applied to the long portion 155 so the fingers 153 will no longer extend outwardly until contact between the backing plate 163 and the short portions 156 of fingers 153 again commences.

Figure 8A:
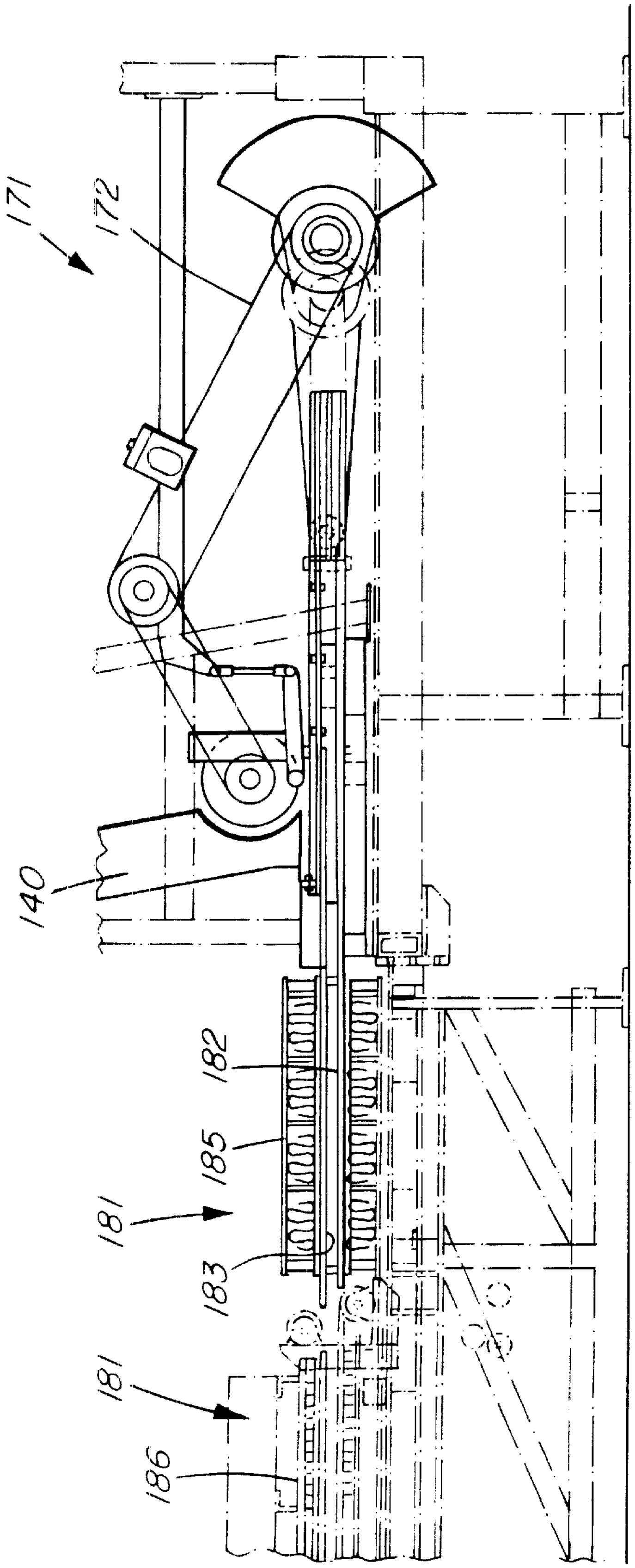
FIGS. 8A and 8B are side and top plan views, respectively, of the fiber packer assembly and the heated platens.
Figure 8C:
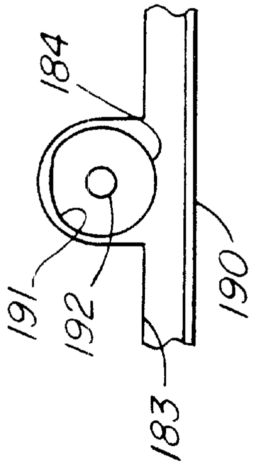
FIG. 8C is an enlarged and diagrammatic vie of one of the heating elements installed in a typical groove formed in the upper one of the platens.
Figure 8B:
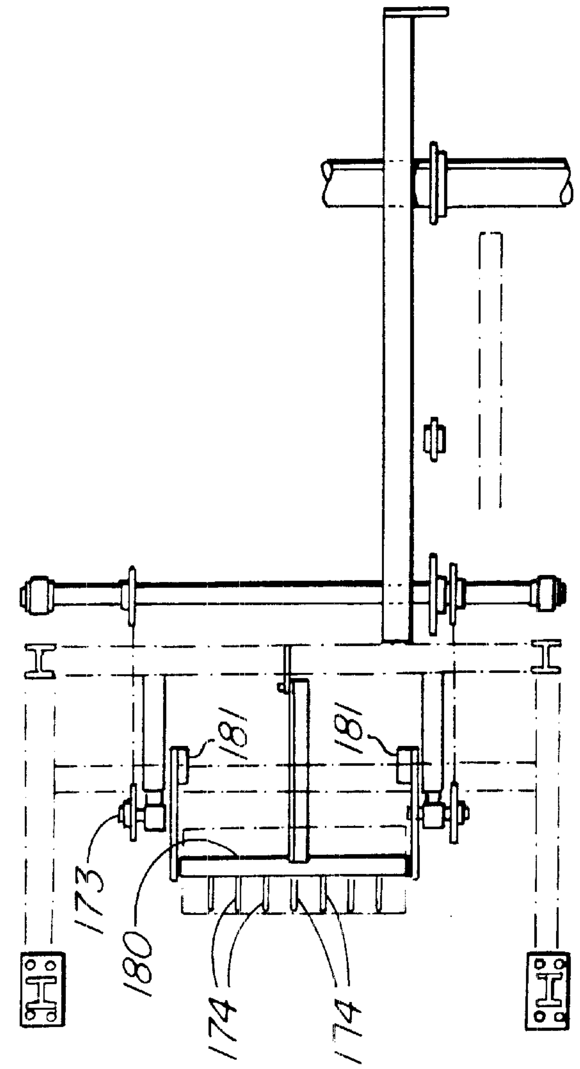

The packer assembly is generally illustrated at 171 in FIGS. 8A and 8B. The packer assembly 171 is operably connected to the ram crankshaft 172 and the packer assembly 171 rotates about axis 173 (FIG. 8B). A plurality of metallic fingers or protuberances 174 extends from the frame 180 and counterweights 181 are connected to the packer assembly 180. As the packer assembly 171 rotates about axis 173, the fingers 174 extend into and are subsequently withdrawn from slots in chute 140 during each revolution. The operation is such that with the ram in or near its most rearward position or during movement thereto, the fingers 174 will move crop material downwardly in chute 140 into the cavity for compression and shearing action by the ram when it moves from its rearward to its forward position.

The severing surfaces of the compression ram and the ram throat are illustrated at 146, 145, respectively. Each surface 145, 146 is used to sever the crop being compressed with the compression cavity 147 extending from chute 140. Each surface 145, 146 is also a sharpened surface which is machined on a removable insert 148, 149, respectively. Insert 148 is connected using bolts 135 extending through a longitudinal groove (not illustrated) to allow for insert movement. Insert 148 may be moved by bolt 136 in the direction of the arrows for adjustment purposes or to maintain the edge position as wear on the insert 148 takes place. Insert 149 is connected to ram 175 using bolts extending through counter sunk holes (not illustrated).

The platen assembly and heating elements are generally illustrated at 181 in FIGS. 8A and 8C. They comprise a primary set of platens 185 with a bottom platen 182 and a top platen 183 and a secondary set of platens 185. A plurality of electrical heating elements 184 are pressed into complementary grooves 191 formed in and extending the width of the primary platens 182, 183 and heat is provided principally by conduction to the fiber panel passing therethrough. The secondary platens 186 are heated by oil circulating rhough the platens 185. Either heating technique, however, could conveniently be used with each set of platens 185, 186. A cover 190 is positioned on the surfaces of platens 182, 183 and the cover presses the heating elements 184 into secure contacting relationship within the grooves 191 of the platens 182, 183. Connections 192 for electricity are provided at the ends of each of the heating elements 184 by way of a generally parallel type connection to provide the necessary electricity for heating elements 184. The heating temperatures are used to cure the glue of the paper applied to the top and bottom surfaces of the severed and compressed fiber and to remove and/or reduce the "springback" inherent in the compressed fiber thereby contributing to a more stable panel member.

Figure 9:
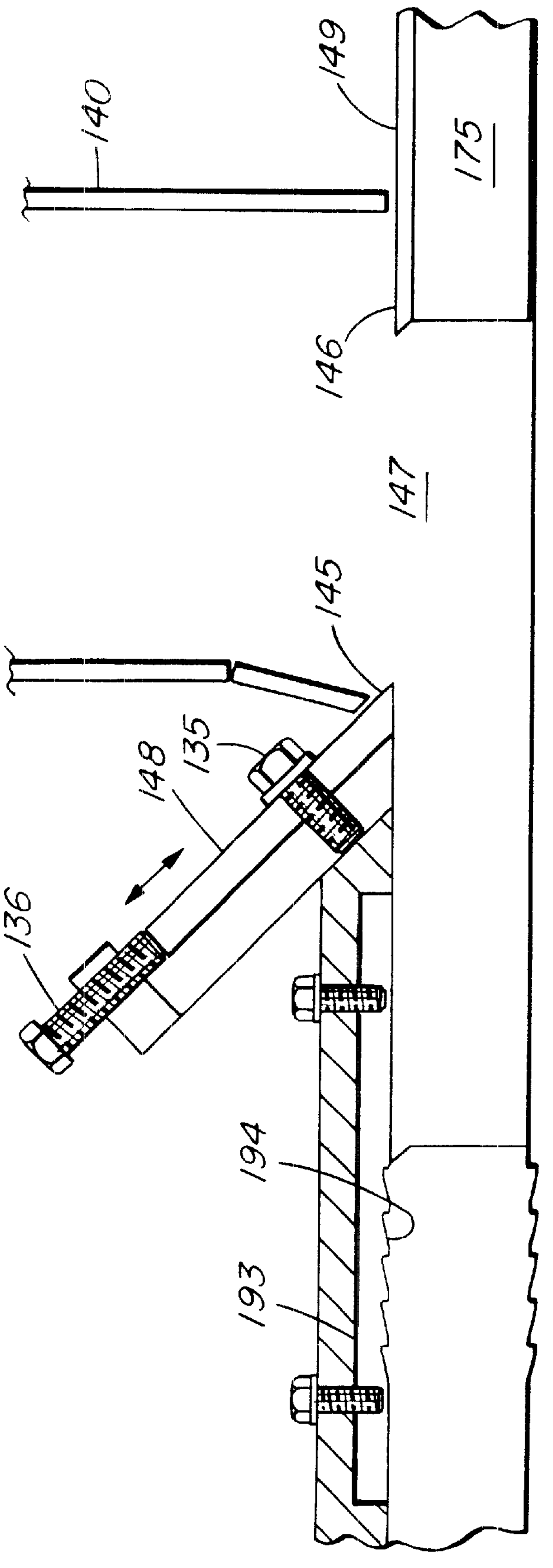
FIG. 9 is an enlarged side view diagrammatically illustrating the shear surfaces of the compression ram and throat assemblies.
Figure 10B:
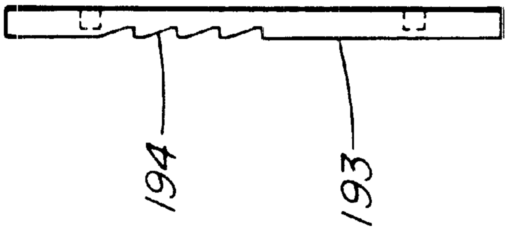
FIGS. 10A and 10B are views of the gill plates within the throat assembly of the compression ram.
Figure 10A:
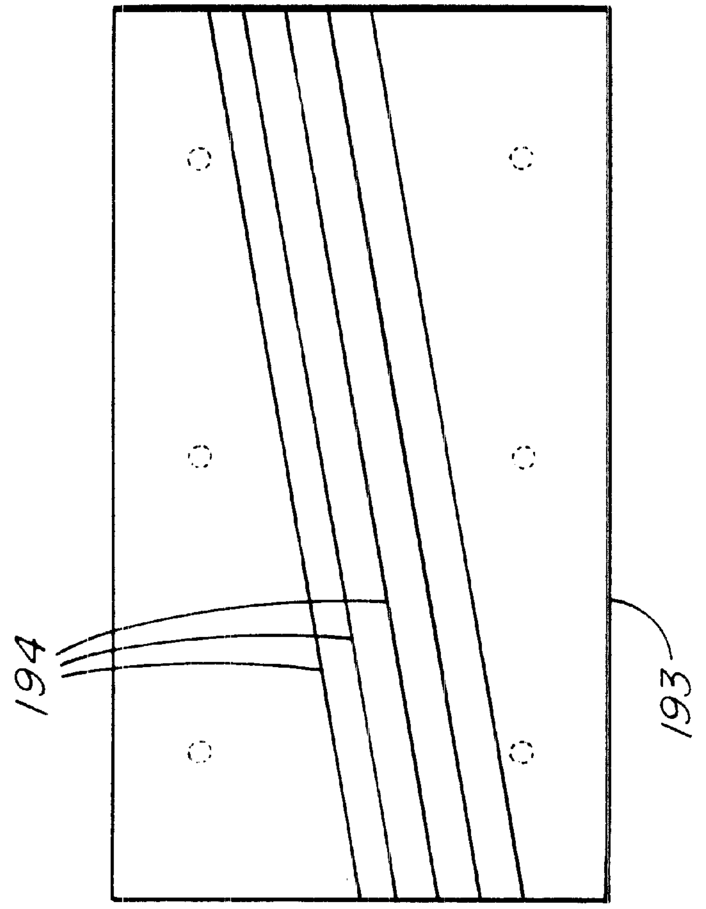

The gill plates 193 are illustrated in FIGS. 10A, 10B and 9. A series of grooves 194 is machined in the gill plates 193. The grooves 194 encourage one way movement of the compressed fiber away from ram 175 and discourage fiber movement towards ram 175 following the fiber compression operation.

Figure 11B:
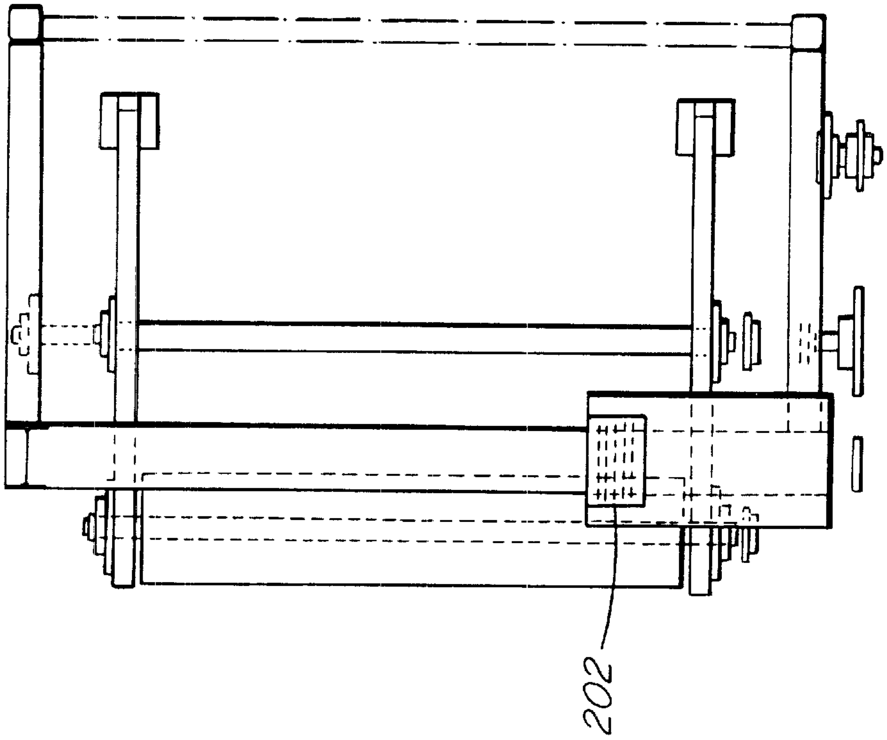
FIGS. 11A and 11B are side and plan views, respectively, of the pneumatically driven puller rollers according to the invention.
Figure 11A:
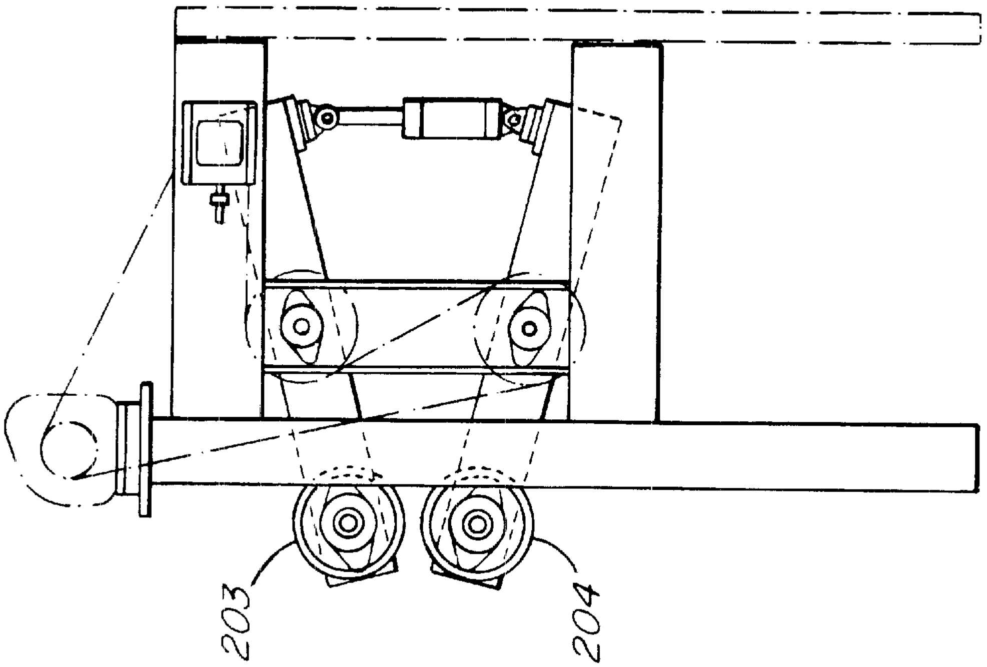

The puller rollers are generally illustrated at 200 in FIGS. 11A and 11B. The puller rollers 200 are downstream of the curing table 201 and are pneumatically powered by pneumatic motor 202. The puller rollers 203, 204 extend across the compressed fiber forming the panel and are brought into contact with the compressed fiber panel. The pneumatic motor 202 allows a give and take type pulling action which allows the rollers 203, 204 to apply a more gentle force on the panel; that is, the rollers 203, 204 will apply a more consistent pulling force of a predetermined value on the panel. The use of the puller rollers 200 allows more consistent fiber content within the panel since, otherwise, there would be a greater concentration of fiber in the panel near the compression ram 145 as the length of the panel increases.

Figure 12:
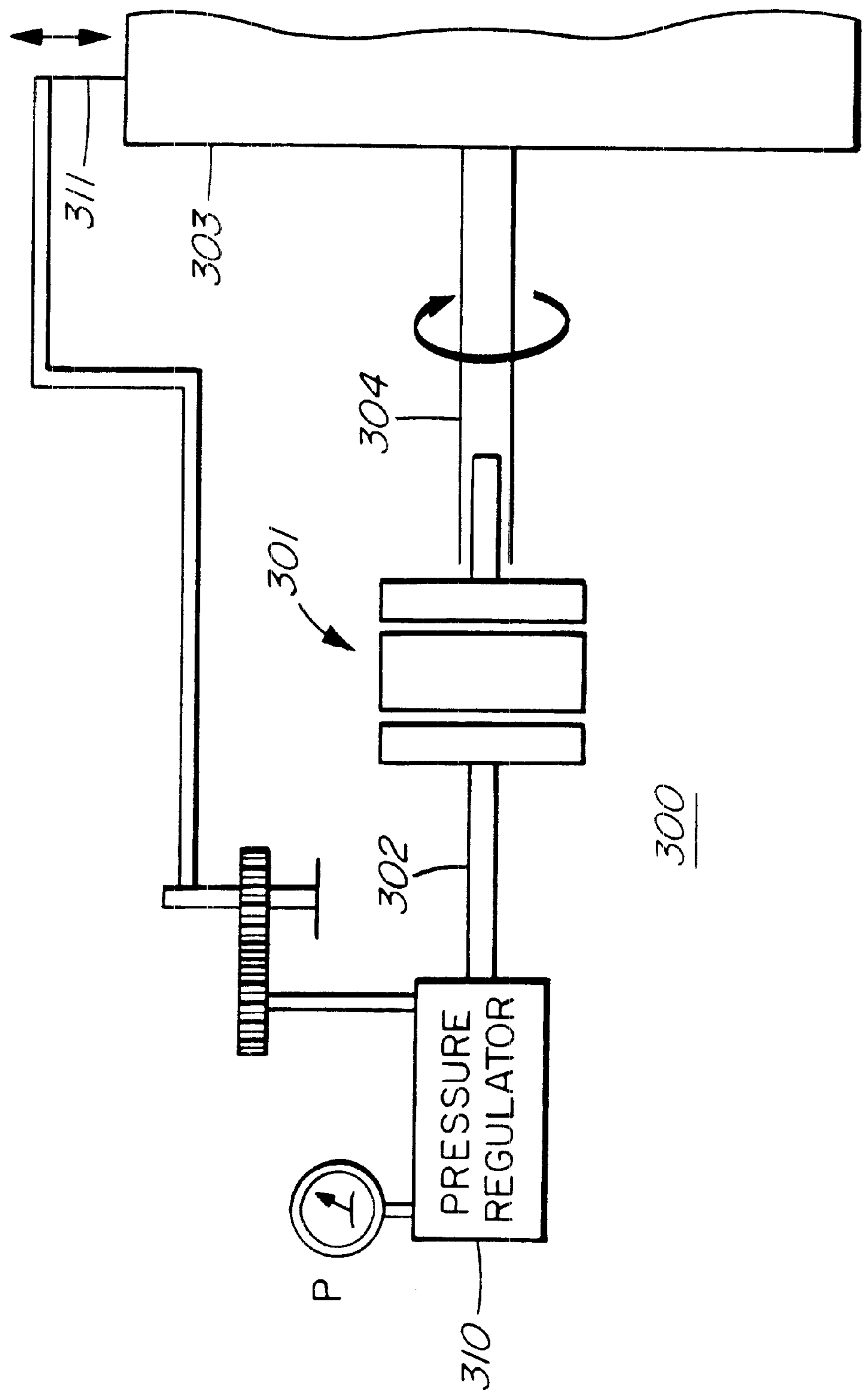
FIG. 12 is a diagrammatic view of the paper tensioner according to a further aspect of the invention.

Referring to FIG. 12, the paper tensioner is generally illustrated at 300. It comprises a brake 301 which turns with shaft 302. The paper roll 303 is mounted on shafts 304. A pressure regulator 310 is regulated by the position of sensor 311 on the paper roll 303.

In operation, as the diameter of the paper roll 303 decreases under use, the sensor 311 will move downwardly in contact with the paper roll 303. The pressure regulator 310 will thereby increase the pressure on the brake 301 which will thereby create an increased resistance to movement by the brake 301 on the paper roll 303. The objective is to maintain a uniform tension in the paper from the roll 303 which is fed to the fiber panel forming apparatus 100.

Operation

In operation and with reference to FIGS. 1A, 1B, 1C and 1D, bales 121 of straw, hay or other fibrous crop material are deposited on the feed conveyor 120 where the crop is then conveyed leftwardly until the debailler rollers 122 are encountered. The debailler rollers 122 debail and separate the material from the bales 121 and deposit the separated material on the straw walkers 124. The seed or grain and other ends and the like fall through the straw walkers 124 and are gathered by feed auger 126. The ends are deposited in a pneumatic air/vacuum system 127 where they are conveyed to a storage area for further use as a feed product or otherwise disposed of.

The straw walkers 124 move the fiber material into the shredder rollers 131 where the fiber material is shredded and deposited on a conveyor 132. Conveyor 132 moves the mat of material to a leveller or evener roller 133 which levels the mat to create a more uniform flow of material up the conveyor 132 until it encounters picker roller 134 which penetrates into the mat of material and encourages material flow down the chute 151 towards the crop compression area 147 (FIG. 9) in the lower portion of the chute 140. The packer assembly 171 is operable to encourage material flow from the chute 140 into the crop compression cavity 147 forwardly of the ram 175 in its rearwardly position.

The ram 175 moves forwardly, severs the fiber material between severing surfaces 145, 146 and compresses it thereby forming a longitudinal panel member with a width that is determined by the width of the ram 175. The compressed and severed material leaves the compression cavity 147 and paper is glued to the top and bottom surfaces of the compressed and severed material. The papered panel then moves into and between the heated platen assembly 181 for curing the glue and removing fiber "springback" from the compressed fiber.

The panel moves intermittently on the curing table 201 by the reciprocating action of the ram 175 and gradually extends in a single piece until the puller rollers 200 are encountered. Puller rollers 200 exert a pulling force on the panel to encourage material consistency within the panel. The panel proceeds to the panel cutting and outlet area where the panel is severed into panels of a desired length. The cut panels are removed from the cutting area and transported to a storage area for use for structural building purposes or otherwise.

While specific embodiments of the invention have been described, such embodiments are illustrative of the invention only and are not to be taken as limiting the invention. Many modifications will readily occur to those skilled in the art to which the invention relates and the invention, therefore, should be defined in accordance with the accompanying claims.

We claim:

1. Processor for obtaining fibrous material from crop comprising a fiber inlet area for bales of fiber material, a debailler area downstream from said fiber material inlet area, straw walkers to convey said fiber material from said debailler area to a conveyor and a shredder area to shred said fiber material downstream of said straw walkers.

2. Processor as in claim 1 and further comprising collector apparatus for collecting seed and/or grain from said fiber material, said straw walkers conveying fiber material from said fiber material inlet area to said conveyor, a gathering member beneath said straw walkers and an auger beneath said gathering member for conveying said seed and/or grain to an air evacuation system, said air evacuation system moving said seed and/or grain to a storage area.

3. Processor as in claim 2 wherein said conveyor conveys said fiber material from said shredder area to a packer area and further comprising a picker adjacent said conveyor at the downstream end of said conveyor and before said packer area, said picker having a series of protruding flexible and non-metallic fingers mounted on a rotatable cylindrical base, said fingers contacting said fiber material on said conveyor and transporting said fiber material to a chute leading to said packer area.

4. Processor as in claim 3 and further comprising glue curing apparatus for curing glue on paper and applying heat to compressed fiber material beneath said paper, said compressed fiber material having an upper and a lower surface, said apparatus comprising an upper and lower platen member operably contacting said paper on said upper and lower surface of said compressed fiber material respectively, each of said upper and lower platen members having a plurality of grooves and heating elements in contact with said platen members within said grooves, said heating elements being longitudinal and extending substantially across said platen members, said heating of said platen members being obtained principally by conduction between said heating elements in contact with said platen members.

5. Processor as in claim 4 and further comprising a chute downstream from said conveyor, a packer assembly to move fiber material from said chute to a compression area, a reciprocating ram to compress said material in said compression area and a fiber feed rake assembly for dislodging material in said chute, said fiber feed rake assembly comprising a plurality of protruding fingers on a longitudinally and generally vertically moving support framework, said protruding fingers extending intermittently into said chute during said longitudinal and generally vertical movement of said support framework.

6. Processor as in claim 5 wherein said reciprocating ram assembly has a forward edge used to shear and compress fiber material into fiber panel members in a fiber panel assembly apparatus and a complementary and stationary edge in said fiber panel assembly apparatus which cooperates with said forward edge of said reciprocating ram assembly during said shearing and compression operation, each of said forward edge of said ram assembly and said stationary edge of said fiber panel assembly apparatus being a sharpened cutting edge and each being used to shear said fiber material during said shearing and compression operation.

7. Processor as in claim 6 and further comprising a pair of puller rolls for grasping and providing movement to said fiber panel members formed by said reciprocating ram assembly, said puller rolls being brought into contacting relationship with said formed fiber panel members and providing movement to said formed fiber panel members downstream of said ram assembly, said puller rolls being pneumatically driven.

8. Processor as in claim 7 and further comprising a braking tensioner for a paper roll having a diameter, said paper roll containing paper being applied to substantially enclosed compressed fiber material used in forming said fiber panel members, said braking tensioner having a first member for monitoring said diameter of said paper roll during operation of said paper roll and a pressure regulator for applying pressure to said braking tensioner and thereby increasing resistance to movement within said braking tensioner, said pressure regulator being dependent on the position of said first member, said braking tensioner applying greater resistance to rotation of said paper roll when said diameter is lesser and lesser resistance to rotation of said paper roll when said diameter is greater.

9. Apparatus for collecting seed and/or grain from a fiber panel forming assembly comprising straw walkers to convey fiber material from a fiber material inlet area to a conveyor assembly, a gathering member beneath said straw walkers and an auger beneath said gathering member for conveying said seed and/or grain to an air evacuation system, said air evacuation system moving said seed and/or grain to a storage area.

10. A conveyor for fiber material being conveyed from a shredder area to a packer area and a picker adjacent said conveyor at the downstream end of said conveyor and before said packer area, said picker having a series of protruding flexible and non-metallic fingers mounted on a rotatable cylindrical base, said fingers contacting said fiber material on said conveyor and transporting said fiber material to a chute leading to said packer area.

11. Apparatus for curing glue on paper and applying heat to compressed fiber material beneath said paper, said fiber material having upper and lower surfaces, said apparatus comprising an upper and lower platen member operably contacting said paper on said upper and lower surfaces of said compressed fiber material, each of said upper and lower platen members having a plurality of grooves and heating elements in contact with said platen members within said grooves, said heating elements being longitudinal and extending substantially across said platen members, said heating of said platen members being obtained principally by conduction between said heating elements in contact with said platen members.

12. A conveyor, a chute downstream from said conveyor, a packer assembly to move fiber material from said chute to a compression area, a reciprocating ram to compress said material in said compression area and a fiber feed rake assembly for dislodging material in said chute, said fiber feed rake assembly comprising a plurality of protruding fingers on a longitudinally and generally vertically moving support framework, said protruding fingers extending intermittently into said chute during said longitudinal and generally vertical movement of said support framework.

13. A reciprocating ram assembly having a forward edge used to shear and compress fiber material used to form panel members in a fiber panel assembly apparatus and a complementary and stationary edge in said fiber panel assembly apparatus which cooperates with said forward edge of said reciprocating ram assembly during said shearing and compression operation, each of said forward edge of said ram assembly and said stationary edge of said fiber panel assembly apparatus being a sharpened cutting edge and used to shear said fiber material during said shearing and compression operation.

14. A pair of puller rolls for grasping and providing movement to a fiber panel formed by a reciprocating ram assembly, said puller rolls being brought into contacting relationship with said formed fiber panel and providing movement to said formed fiber panel downstream of said ram assembly, said puller rolls being pneumatically driven.

15. A braking tensioner for a paper roll having a diameter, said paper roll containing paper being applied to a substantially enclosed compressed fiber material used in forming a panel member, said braking tensioner having a first member for monitoring said diameter of said paper roll during operation of said paper roll and a pressure regulator for applying pressure to said braking tensioner and thereby increasing resistance to movement within said braking tensioner, said pressure regulator being dependent on the position of said first member, said braking tensioner applying greater resistance to rotation of said paper roll when said diameter is lesser and lesser resistance to rotation of said paper roll when said diameter is greater.

* * * * *